(12) United States Patent
Chen et al.

(10) Patent No.: US 8,738,037 B1
(45) Date of Patent: May 27, 2014

(54) IDENTIFYING MOBILE ACCESS POINTS

(71) Applicant: Google Inc., Mountain View, CA (US)

(72) Inventors: Tsuwei Chen, Cupertino, CA (US);
Stanley Andrews Chesnutt, Berkeley, CA (US)

(73) Assignee: Google Inc., Mountain View, CA (US)

( * ) Notice: Subject to any disclaimer, the term of this patent is extended or adjusted under 35 U.S.C. 154(b) by 14 days.

(21) Appl. No.: 14/035,849

(22) Filed: Sep. 24, 2013

Related U.S. Application Data

(63) Continuation of application No. 13/559,539, filed on Jul. 26, 2012, now Pat. No. 8,571,578.

(51) Int. Cl.
*H04W 24/00* (2009.01)
(52) U.S. Cl.
USPC .......................................................... 455/456.1

(58) Field of Classification Search
USPC ....................................................... 455/456.1
See application file for complete search history.

(56) References Cited

U.S. PATENT DOCUMENTS 8,571,578 B1    10/2013   Chen et al.
2010/0159958 A1  6/2010   Naguib et al.

*Primary Examiner* — Temica M Beamer
*Assistant Examiner* — Joel Ajayi
(74) *Attorney, Agent, or Firm* — McDermott Will & Emery LLP

(57) ABSTRACT

Systems and methods for identifying mobile access points are provided. In one aspect, a method includes receiving an indication of an accessible access point and an indication of geographic location. The method also includes determining that a stored geographic location associated with the accessible access point is inconsistent with the indication of the geographic location. The method also includes providing, to a server and to a local memory, an indication that the accessible access point is a candidate mobile access point based on the determination that the stored geographic location is inconsistent with the indication of the geographic location.

10 Claims, 9 Drawing Sheets

IDENTIFYING MOBILE ACCESS POINTS

CROSS-REFERENCE TO RELATED APPLICATION

This application is a continuation of U.S. patent application Ser. No. 13/559,539, filed on Jul. 26, 2012, and entitled "Identifying Mobile Access Points," the entire content of the application is incorporated by reference herein.

The subject technology generally relates to network-based applications and, in particular, relates to identifying mobile access points.

BACKGROUND

Databases storing geographic locations of access points (e.g., WiFi access points identified by a media access control (MAC) address) are useful for allowing a computing device (e.g., a mobile phone) to quickly determine its location for mapping, navigation, geographic check-ins, etc. Such databases are created, for example, by observing and storing the geographic locations of access points. A fixed access point (e.g., a WiFi access point stored in a home or an office) may be associated, in a geographic location database, with a geographic location where it is observed, as such access points are rarely moved from one geographic location to another. However, a mobile access point (e.g., a WiFi access point in a bus or a train) may be associated, in the geographic location database, with an inaccurate geographic location where it may have been observed. Thus, a computing device accessing a mobile access point may incorrectly determine the geographic location of the computing device based on inaccurate data in the database. As the foregoing illustrates, an approach for identifying mobile access points may be desirable.

SUMMARY

The disclosed subject matter relates to a method for providing an indication that an access point is a candidate mobile access point. The method includes receiving an indication of an accessible access point and an indication of geographic location. The method also includes determining that a stored geographic location associated with the accessible access point is inconsistent with the indication of the geographic location. The method also includes providing, to a server and to a local memory, an indication that the accessible access point is a candidate mobile access point based on the determination that the stored geographic location is inconsistent with the indication of the geographic location.

The disclosed subject matter further relates to a non-transitory computer-readable medium. The computer-readable medium includes instructions that, when executed by a computer, cause the computer to implement a method for providing an indication that an access point is a candidate mobile access point. The instructions include code for receiving an indication of an accessible access point and an indication of geographic location. The instructions also include code for determining a stored geographic location associated with the accessible access point based on a lookup in an access point location data store. The instructions also include code for determining that the stored geographic location associated with the accessible access point is inconsistent with the indication of the geographic location. The instructions also include code for providing, to a server, an indication that the accessible access point is a candidate mobile access point based on the determination that the stored geographic location is inconsistent with the indication of the geographic location.

The disclosed subject matter further relates to a system. The system includes one or more processors. The system also includes a memory. The memory includes instructions that, when executed by the one or more processors, cause the one or more processors to implement a method for providing an indication that an access point is a candidate mobile access point. The instructions include code for receiving a media access control (MAC) address of an accessible WiFi access point and an indication of geographic location. The instructions also include code for determining that a stored geographic location associated with the accessible WiFi access point is inconsistent with the indication of the geographic location. The instructions also include code for providing, to a server, an indication that the accessible WiFi access point is a candidate mobile access point based on the determination that the stored geographic location is inconsistent with the indication of the geographic location.

The disclosed subject matter further relates to a non-transitory computer-readable medium. The computer-readable medium includes instructions that, when executed by one or more computers, cause the one or more computers to implement a method for determining that an access point is mobile. The instructions include code for receiving a first threshold number of candidate mobile access point reports associated with a first specified access point. The first threshold number of candidate mobile access point reports are associated with at least a second threshold number of unique geographic locations. The instructions also include code for determining that the first specified access point is mobile based on the first threshold number of mobile access point reports. The instructions also include code for providing an indication that the first specified access point is a mobile access point.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

Figure 1:
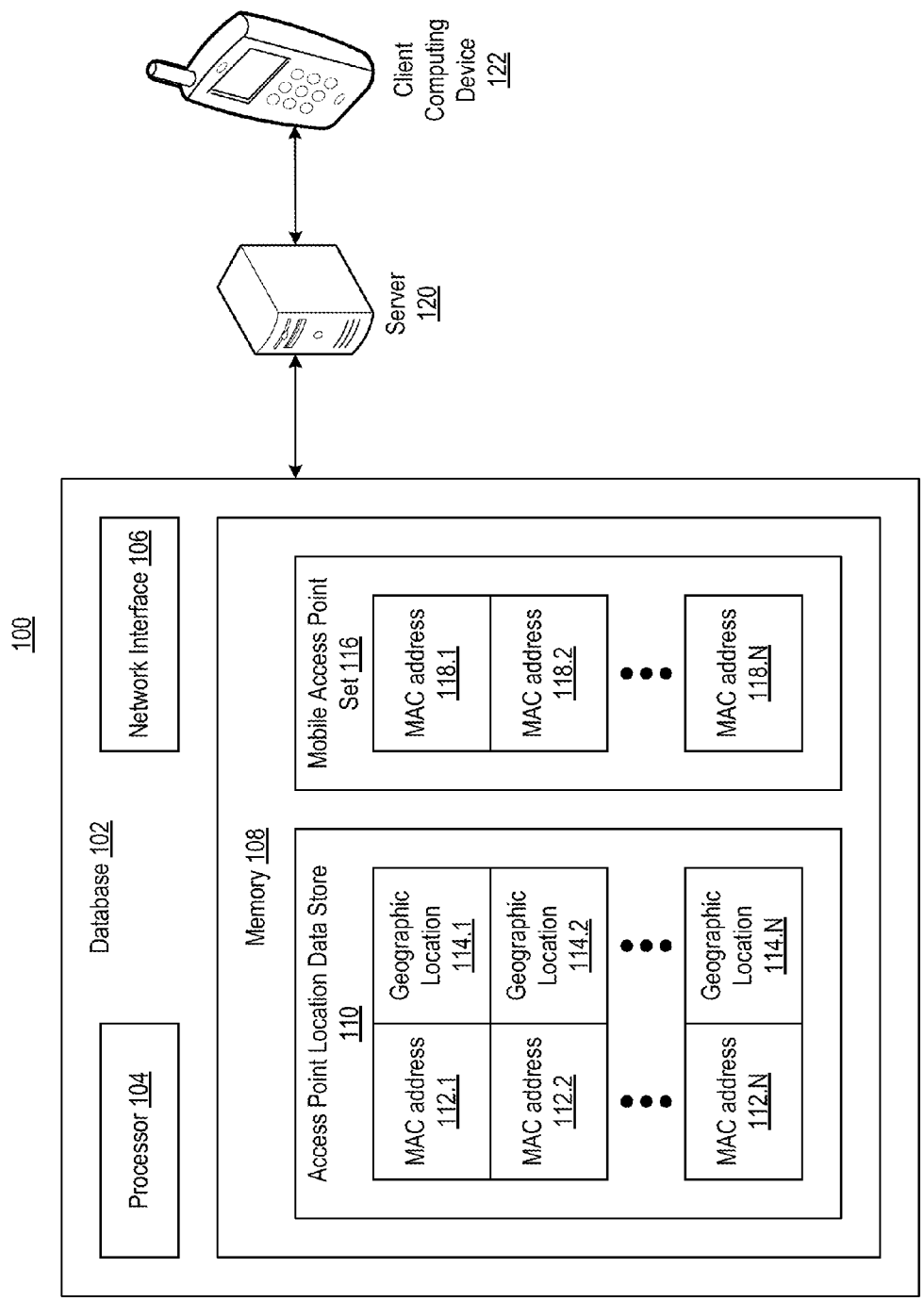
FIG. 1 illustrates an example of a system configured to identify mobile access points.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is related to approaches for providing an indication that an access point (e.g., a WiFi access point) is a mobile access point (e.g., an access point in a bus or a train). In one aspect, a client computing device (e.g., a mobile phone or a laptop computer) may receive an indication of an accessible access point and an indication of geographic location. The indication of the accessible access point may include the MAC address of the access point. The indication of the geographic location may be based on a signal from a cellular tower or a signal from one or more global positioning system (GPS) satellites.

The client computing device may determine a stored geographic location associated with the accessible access point based on a lookup in an access point location data store. The access point location data store may reside in a database, accessible via the Internet, or locally on the client computing device. The client computing device may store a list of access points that were accessible to the client computing device in the past and their geographic locations. The client computing device may determine that the stored geographic location associated with the accessible access point is inconsistent with the indication of the geographic location (e.g., the client computing device may receive signals from an accessible access point having a stored geographic location in Washington, D.C., and a cellular signal located in Atlanta, Ga., simultaneously). The client computing device may provide, to a server, an indication that the accessible access point is a candidate mobile access point based on the determination that the stored geographic location is inconsistent with the indication of the geographic location.

The client computing device may also receive a threshold number (e.g., three) of additional indications of the accessible access point and additional indications of geographic location. The client computing device may determine that the stored geographic location associated with the accessible access point is inconsistent with the additional indications of the geographic location. The client computing device may provide, to the server, a stronger indication that the accessible access point is a mobile access point based on the threshold number of additional indications. Upon receiving a certain number of indications that a specified access point is a candidate mobile access point or that the specified access point is a mobile access point, the server may conclude that the specified access point is a mobile access point, and update the database accordingly.

Advantageously, the subject technology provides techniques for identifying mobile access points. As a result, a computing device requesting to determine its geographic location based on one or more accessible access points may receive a geographic location based on accessible fixed access points, but not based on accessible mobile access points, which may be at multiple different geographic locations.

FIG. 1 illustrates an example of a system 100 configured to identify mobile access points.

As shown, the system 100 includes a database 102, a server 120 and a client computing device 122. The database 102, server 120, and client computing device 122 may be configured to communicate with one another via a network, e.g., the Internet or a cellular network. While only one database 102, server 120, and client computing device 122 are illustrated, the subject technology may be implemented with one or more databases 102, servers 120, and client computing devices 122. Alternatively, a single machine may implement the functions two or more of the database 102, the server 120, or the client computing device 122. Furthermore, the server 120 may include a single-processor machine, a multi-processor machine, or multiple machines including multiple processors.

The database 102 may be configured to store information that other computing devices, e.g., the server 120, may access, e.g., via a network.

As shown, the database 102 includes a processor 104, a network interface 106, and a memory 108. The processor 104 is configured to access data or execute computer instructions that are stored in a computer-readable medium, for example, the memory 108. For example, the processor 104 may be a central processing unit (CPU). As shown, the database 102 includes a single processor 104. However, the database may include multiple processors 104. The network interface 106 is configured to allow the database 102 to transmit and receive data in the network. The network interface 106 may include one or more network interface cards (NICs). The memory 108 stores data and instructions. As illustrated, the memory 108 stores an access point location data store 110 and a mobile access point set 116.

The access point location data store 110 stores one or more identifiers of access points, e.g., MAC addresses 112.1-$n$. Each MAC address 112.$k$ may correspond to an access point for a local area network (LAN), e.g., a WiFi access point, a wired local area network access point, or a wireless local area network access point. One or more MAC address 112.$k$ may have a corresponding geographic location 114.$k$. The access point location data store may store a correspondence of a MAC address (e.g., MAC address 112.$k$) to a geographic location (e.g. geographic location 114.$k$). With proper permissions from owners of access points, the access point location data store 110 may store correspondences between MAC addresses 112 and geographic locations 114. As used herein, the phrase "geographic location" encompasses its plain and ordinary meaning, including but not limited to a place or position of an object (e.g., an access point or a computing device) that may be expressed as a latitude and longitude or as a street address.

The mobile access point set 116 stores one or more identifiers of access points, e.g., MAC addresses 118.1-$n$. Each MAC address 118.$k$ may correspond to an access point that has been identified as mobile and, therefore, may not be associated with a fixed geographic location. As used herein, the term "mobile" encompasses its plain and ordinary meaning, including but not limited to an object that is moved by at least a threshold distance at least once every threshold time period. The threshold distance may be greater than a coverage area from which the access point is visible or detectable (e.g., 100 meters for a typical WiFi access point). Example threshold distances may be one kilometer, five kilometers, ten kilometers, twenty kilometers, or fifty kilometers. The threshold time period may be a time period in which units including mobile access points (e.g., buses, trains, and airplanes) are typically moved. Example threshold time periods may include one day, one work day, one week, or one month.

As illustrated, a MAC address 112.k or 118.k is used to identify an access point. However, any other identifier for an access point (e.g., a service set identifier (SSID)) may be used in place of the MAC address 112.k or 118.k.

The server 120 may be configured to receive indications of mobile access points and to update the database 102 based on the indications of the mobile access points. The server 120 may also be configured to determine a geographic location of a device based on access points that are accessible to the device (e.g., via a lookup in the access point location data store 110). The server 120 may be a single machine with a single processor, a single machine with multiple processors, or a server farm including multiple machines with multiple processors. In example aspects, a single machine may implement that functions of both the database 102 and the server 120.

The client computing device 122 may be any computing device capable of interacting with the server 120 or of connecting to one or more access points. For example, the client computing device 122 may include a mapping application, a navigation application, or a geographic check-in application that may request a geographic location of the client computing device 122. The client computing device 122 may be a laptop computer, a desktop computer, a mobile phone, a personal digital assistant (PDA), a tablet computer, a netbook, a television with one or more processors embedded therein or coupled thereto, a physical machine, or a virtual machine, for example. Other devices could also implement the functionalities of the client computing device 122. The client computing device 122 may include one or more of a keyboard, a mouse, a touch screen, and a display to allow a user to interact with the client computing device 122. Furthermore, while only one client computing device 122 is illustrated in FIG. 1, the techniques disclosed herein may be implemented with one or more client computing devices 122.

Figure 2:
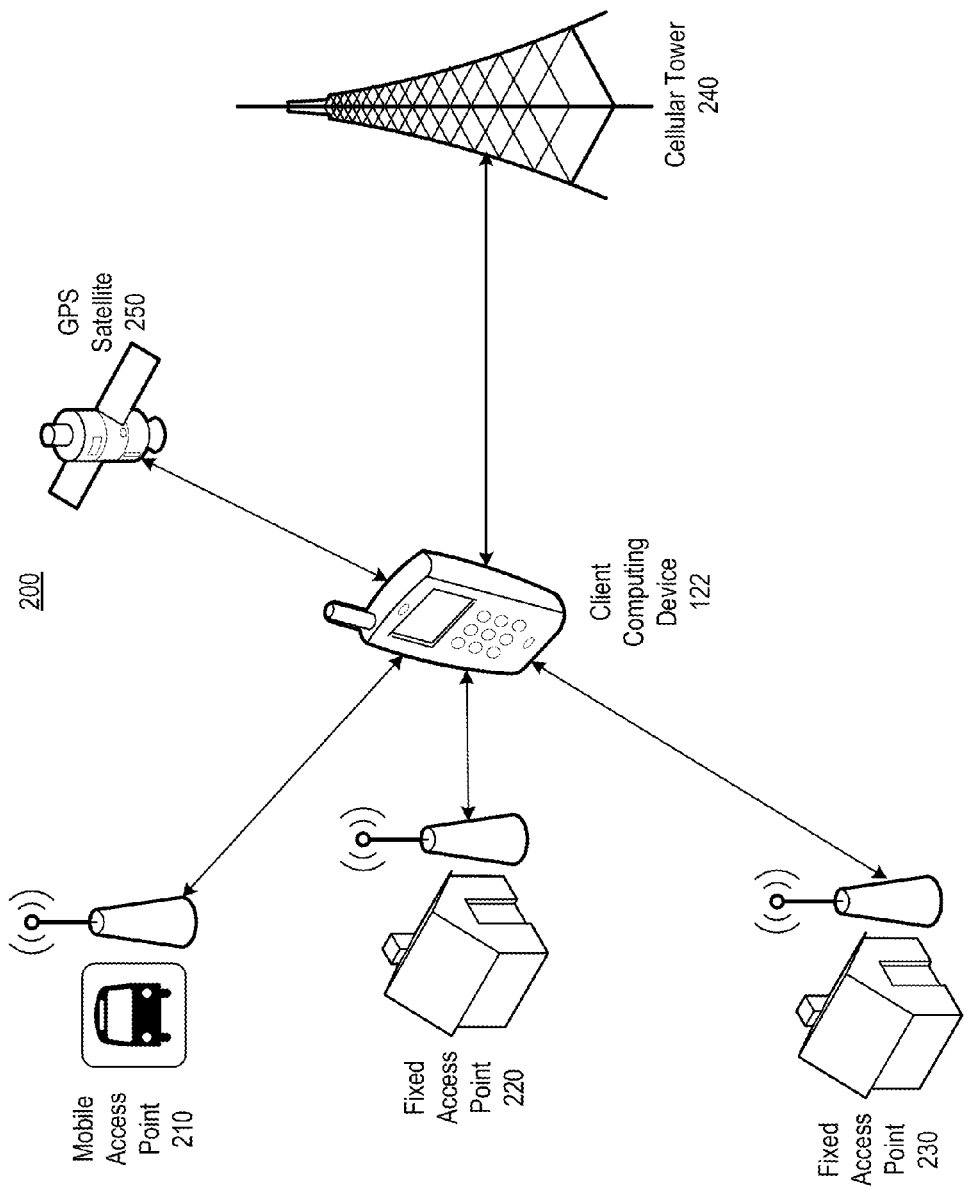
FIG. 2 illustrates an example of a system in which a device may be connected to multiple information sources.

FIG. 2 illustrates an example of a system 200 in which a device (e.g., client computing device 122) may be connected to multiple information sources.

As shown, the system 200 includes the client computing device 122, a mobile access point 210 (e.g., a WiFi access point in a bus), fixed access points 220 and 230 (e.g., WiFi access points in homes), a cellular tower 240, and a GPS satellite 250. While one mobile access point 210, two fixed access points 220 and 230, one cellular tower 240, one GPS satellite 250 are illustrated in FIG. 2, the subject technology may be implemented with any number of mobile access points, fixed access points, GPS satellites, and cellular towers. In some aspects, no GPS satellite and no cellular tower may be accessible to the client computing device 122.

The access points 210, 220, or 230 may be associated with a wireless local area network (LAN) a wired local area network, or a WiFi network. One or more access points 210, 220, or 230 may be accessible to the client computing device 122 simultaneously. For example, a user may connect the client computing device 122 (e.g., a laptop computer) via an Ethernet cable to access point 220, which may represent, for example, a wired local area network in an office. While connected to the wired local area network in the office, the client computing device 122 may detect, via a wireless radio associated with a network interface of the client computing device 122, an unsecured WiFi network of a bus passing by the office that is accessible to the client computing device 122. The unsecured WiFi network of the bus may, for example, correspond to access point 210. The wireless radio of the client computing device 128 may also detect a secured WiFi network of a home across the street from the office that is accessible to the client computing device 122. The secured WiFi network of the home may correspond, for example, to access point 230. It should be noted that, while the client computing device 122 may not be able to connect to the secured WiFi network of the home, the client computing device 122 may still detect that the client computing device 122 is located geographically proximate to the access point of the secured WiFi network and, therefore, the client computing device 122 may, with proper permissions from the owner of the secured WiFi access point, transmit (e.g., via a cellular network or an access point different from access point 230) this information to the server 120 for use in determining the geographic location of the client computing device 122 or the access point 230. Furthermore, while three access points 210, 220, and 230 are illustrated in FIG. 2, the client computing device 122 may be able to detect no access points, one access point, or any other number of access points (e.g., multiple access points).

The client computing device 122 may also be connected to a cellular tower 240. The cellular tower 240 may store, among other things, an indication of its geographic location. The cellular tower 240 may transmit its geographic location to the client computing device 122 and the client computing device 122 may user the location of the cellular tower 240 to determine its own location and to verify that its location is consistent with the stored (e.g., in the database 102) location of the accessible access points 210, 220, or 230. For example, the client computing device 122 may determine its geographic location within a certain radius (e.g., within a 20 km radius) based on the location of the cellular tower 240. The client computing device 122 may then verify that the stored geographic location of the accessible access points 210, 220, and 230 is consistent with the geographic location of the cellular tower 240 (i.e., that the stored geographic location of each of the access points 210, 220, and 230 is within a 20 km radius of the geographic location of the cellular tower 240). In one example, the client computing device 122 may implement triangulation to determine its geographic location based on the geographic locations of at least three cellular towers accessible to the client computing device 122.

The client computing device 122 may also be connected to a global positioning system (GPS) satellite 250. The GPS satellite 250 may store, among other things, an indication of its geographic location. The GPS satellite 250 may transmit its geographic location to the client computing device 122 and the client computing device 122 may user the geographic location of the GPS satellite 250 to compute its own geographic location. For example, the client computing device 122 may determine its location within a certain radius (e.g., within a 5 km radius) based on the geographic location of the GPS satellite 250. Alternatively, the client computing device 122 may implement triangulation to determine its geographic location based on the geographic locations of at least three GPS satellites accessible to the client computing device 122.

As used herein, the term "triangulation" encompasses its plain and ordinary meaning, including but not limited to the approach described below. In one example, to determine its geographic location by triangulation, a client computing device 122 may receive three source signals associated with specified geographic locations (e.g., from three cellular towers or three GPS satellites) and determine the relative strengths of the signals (e.g., one signal is twice as strong as another). Based on the relative strengths of the signals, the client computing device 128 may determine its relative distance between the three specified geographic locations of the source signals. The client computing device 122 may then calculate its own geographic location based on the relative distances from the three specified geographic locations.

Figure 3:
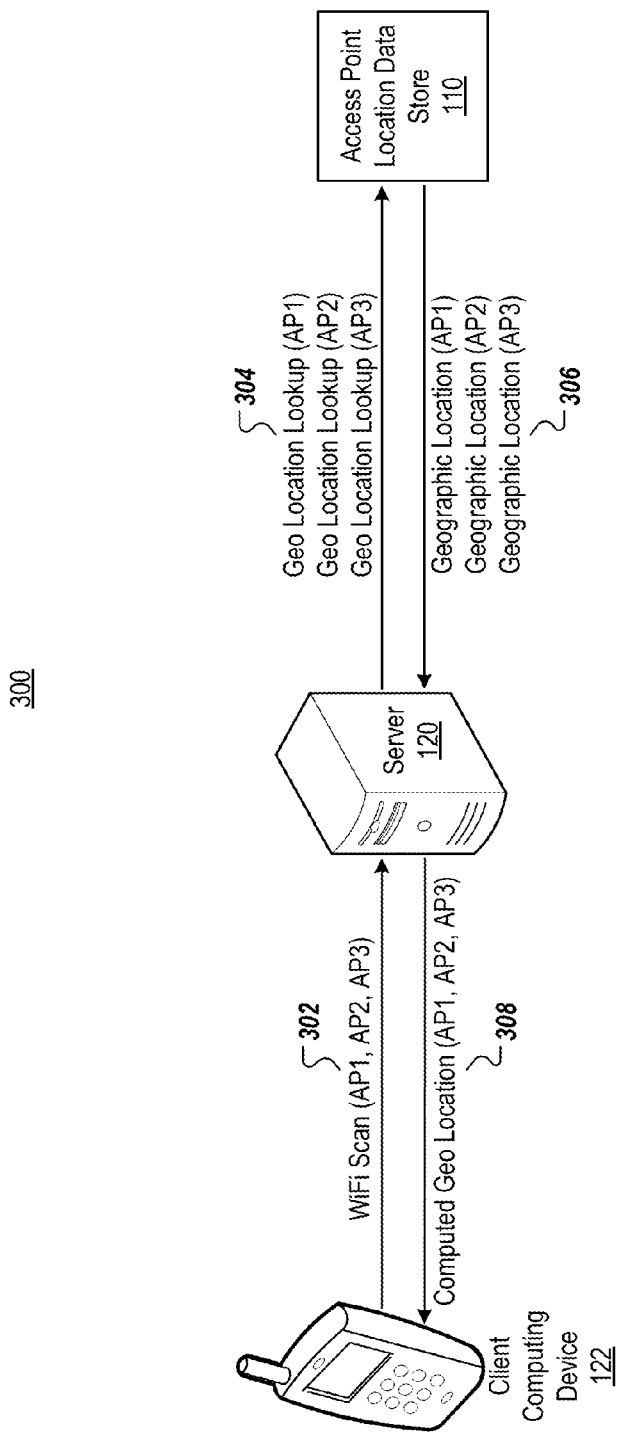
FIG. 3 illustrates an example data flow diagram in which a device may determine its geographic location.

FIG. 3 illustrates an example data flow diagram 300 in which a device (e.g., the client computing device 122) may determine its geographic location. The data flow diagram 300 illustrates a data flow between the client computing device 122, the server 120, and the access point location data store 110 of the database 102.

As shown, to determine the geographic location of the client computing device 122, the client computing device 122 may take a WiFi scan and detect one or more accessible access points (e.g., AP1, AP2, and AP3). The client computing device 122 may or may not connect to a network associated with the accessible access points. For example, the accessible access points may be associated with a password that is unknown to the user of the client computing device 122 and not stored on the client computing device 122. The client computing device 122 may transmit the WiFi scan, including indications (e.g., MAC addresses) of the scanned access points, to the server 120 in data transmission 302.

In data transmission 304, the server 120 may transmit a geographic location lookup request for each of the accessible access points AP1, AP2, and AP3 to the access point location data store 110.

In data transmission 306, the access point location data store 110 may transmit the geographic location of AP1, the geographic location of AP2, and the geographic location of AP3 to the server 120. The server 120 may then determine the geographic location of the client computing device 122 based on the geographic locations of AP1, AP2, and AP3. If the geographic location of the client computing device 122 can be determined based on the accessible access points (e.g., if all of the accessible access points are fixed access points within a WiFi signal range (e.g., 100 meters) of one another), the computed geographic location based on the access points may be transmitted from the server 120 to the client computing device 122 in data transmission 308. In some implementations, e.g., if AP1 is a fixed access point in San Francisco, Calif., AP2 is a fixed access point in Miami, Fla., and AP3 is a fixed access point in New York City, N.Y., a computed geographic location for the client computing device 122 may not be determined based on the accessible access points, and the server 110 may transmit a message indicating that the geographic location is not available to the client computing device 122.

As illustrated in FIG. 3, the client computing device 122 may detect three accessible access points, AP1, AP2, and AP3. However, the subject technology may be implemented with any number of accessible access points, for example, one, two, three, or more than three accessible access points.

Figure 4:
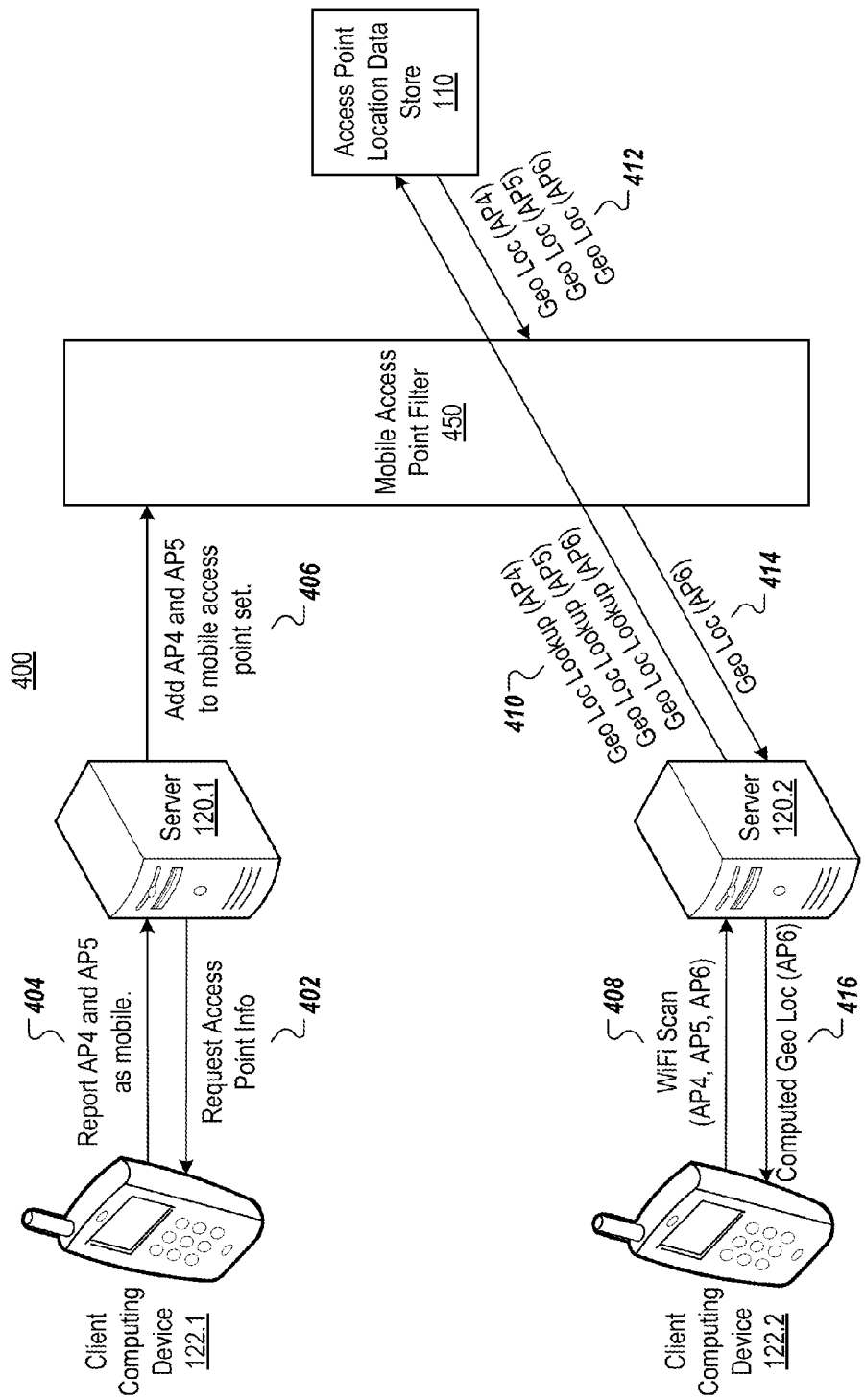
FIG. 4 illustrates an example data flow diagram in which a device may identify mobile access points.

FIG. 4 illustrates an example data flow diagram 400 in which a device (e.g., client computing device 122.1) may identify mobile access points. The data flow diagram 300 illustrates a data flow between client computing device 122.1, server 120.1, mobile access point filter 450, access point location data store 110, client computing device 122.2, and server 120.2. The servers 120.1 and 120.2 may be the same machine or different machines. Each of the servers 120.1 and 120.2 may be a single machine or a server farm including multiple machines. The client computing devices 122.1 and 122.2 may be the same machine or different machines.

The mobile access point filter 450 may be communicatively coupled with the mobile access point set 116 of FIG. 1, i.e., the mobile access point filter 450 may be able to transmit data to and receive data from the mobile access point set 116. The mobile access point filter 450 may reside within the database 102, within a server 120, or within a machine different from the database 102 and the server 120. If the mobile access point filter 450 resides in a server 120.1 or 120.2 transmissions between the mobile access point filter 450 and the server 120.1 or 120.2 may be transmissions between the mobile access point filter 450 and another module in the server 120.1 or 120.2.

In data transmission 402, the server 120.1 requests access point information from the client computing device 122.1. In one example, the server 120.1 may request access point information from the client computing device in response to a query, by the client computing device, for the current geographic location of the client computing device.

In data transmission 404, the client computing device 122.1 responds to the request from the server 120.1 by reporting that access points AP4 and AP5 are mobile. The client computing device 122.1 may determine that access points AP4 and AP5 are mobile, for example, by implanting all or a portion of the processes 500 and 700 described herein in conjunction with FIG. 5 and FIG. 7.

In data transmission 406, the server 120.1 transmits to the mobile access point filter 450 instructions to add AP4 and AP5 to the mobile access point set 116. The access points AP4 and AP5 may then be added to the mobile access point set 116.

In data transmission 408, the client computing device 122.2 transmits, to the server 120.2, a WiFi scan including accessible access points AP4, AP5, and AP6 in conjunction with a request for a current geographic location of the client computing device 122.2.

In data transmission 410, the server 120.2 transmits, to the access point location data store 110, a request for a geographic location lookup of each of the access points AP4, AP5, and AP6.

In data transmission 412, the access point location data store 110 transmits, to the mobile access point filter 450, the geographic locations of AP4, AP5, and AP6. The mobile access point filter 450 may then filter out the geographic locations of the access points AP4 and AP4 which are in the mobile access point set 116.

In data transmission 414, the mobile access point filter 450 transmits, to the server 120.2, the geographic locations of the access points in the lookup request of data transmission 410 that were not filtered out by the mobile access point filter 450 (geographic location of AP6). The server 120.2 may then determine the geographic location of the client computing device 122.2 based on the geographic location of the access point AP6.

In an alternative implementation, instead of data transmissions 410, 412, and 414, the server 120.2 could transmit the geographic location lookups of AP4, AP5, and AP6 to the mobile access point filter 450. The mobile access point filter 450 could then filter out the identified mobile access points AP4 and AP5 and transmit, to the access point location data store 110, a geographic location lookup for the fixed access point AP6. The geographic location of AP6 could then be transmitted from the access point location data store 110 to the server 120.2.

In data transmission 416, the server 120.2 transmits the computed geographic location of the client computing device 122.2, based on the geographic location of access point AP6, to the client computing device 122.2.

In FIG. 4, the subject technology is described in conjunction with two mobile access points (AP4 and AP5) and one fixed access point (AP6). However, the subject technology may be implemented in conjunction with any number of fixed access points and any number of mobile access points.

Advantageously, as a result of the data flows illustrated in FIG. 4, mobile access points identified by one client computing device may be used to benefit the other client computing devices that query the database to determine their geographic locations based on accessible access points.

Figure 5:
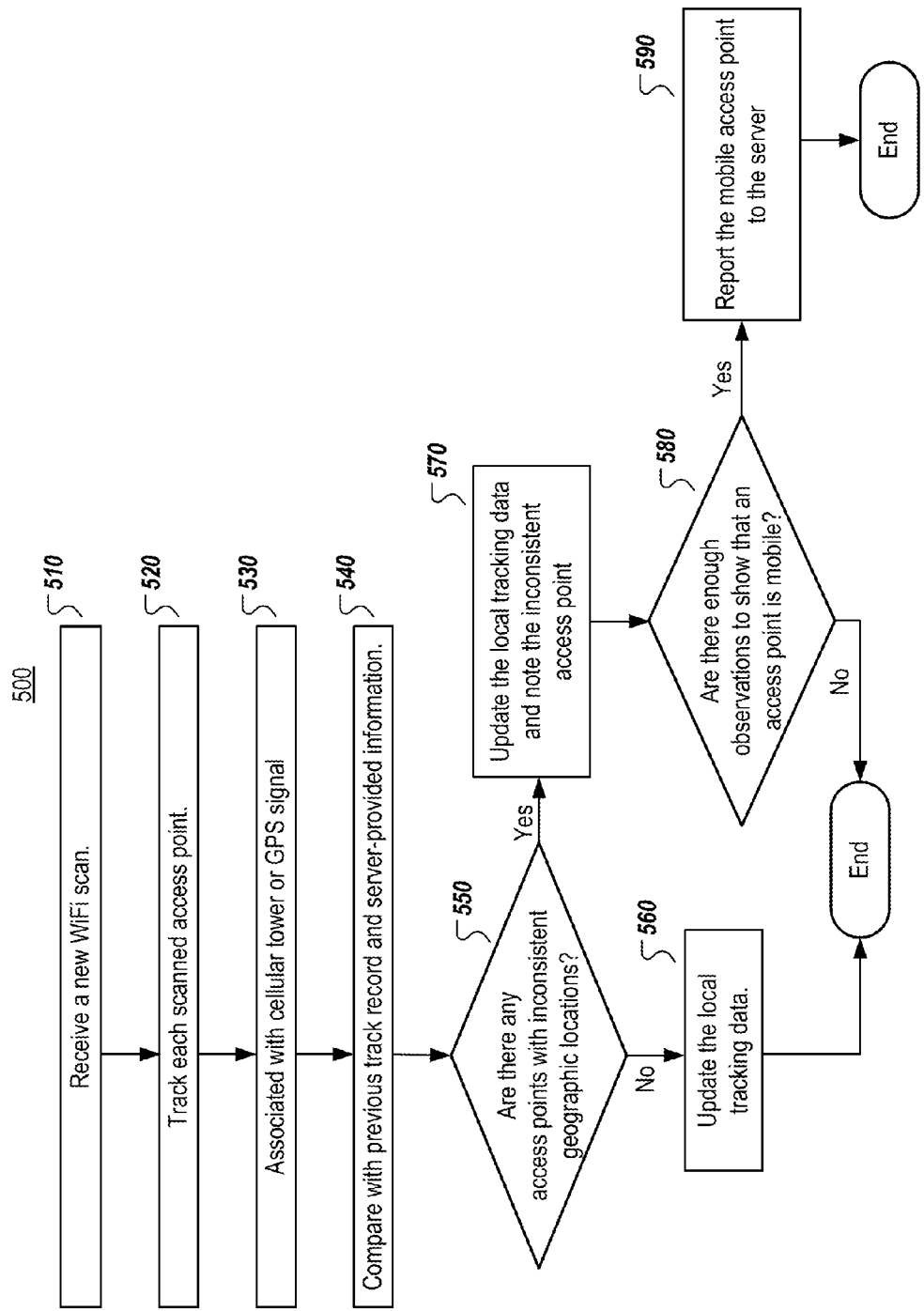
FIG. 5 illustrates an example process by which a mobile access point report may be generated via a client computing device.

FIG. 5 illustrates an example process 500 by which a mobile access point report may be generated via a client computing device.

The process 500 begins at step 510, where the client computing device (e.g., client computing device 122) receives a new WiFi scan (a scan for accessible WiFi access points).

In step 520, the client computing device tracks each scanned accessible access point in the WiFi scan.

In step 530, the client computing device associated the scanned accessible access points in the WiFi scan with an indication of geographic location, e.g., a signal from a cellular tower having a geographic location or a global positioning system (GPS) signal indicating a geographic location.

In step 540, the client computing device compares the indication of the geographic location for each scanned accessible access point with the previous track record of geographic locations of the WiFi access point stored on the client computing device, and with a geographic location of the WiFi access point provided by the server (e.g., via a database).

In step 550, the client computing device determines whether there are any access points in the WiFi scan with inconsistent geographic locations (relative to either the previous track record stored locally on the client computing device or the geographic location stored on the server). If there are no access points in the WiFi scan with inconsistent geographic locations, the process 500 continues to step 560. If there is one or more access point in the WiFi scan with an inconsistent geographic location, the process 500 continues to step 570.

In step 560, if there are no access points in the WiFi scan with inconsistent geographic locations, the client computing device updates the local tracking data for the WiFi access points in the WiFi scan. After step 560, the process 500 ends.

In step 570, if there is one or more access point in the WiFi scan with an inconsistent geographic location, the client computing device updates the local tracking data for the WiFi access points in the WiFi scan and notes the access point(s) with the inconsistent geographic location(s).

In step 580, the client computing device determines whether there are enough observations of inconsistent geographic location for a specific access point to show that the specific access point is mobile. In one example, there may need to be at least a threshold number (e.g., three) of observations of inconsistent geographic location for the specific access point to show that the specific access point is mobile. If there are not enough observations of inconsistent geographic location for the specific access point to show that the specific access point is mobile, the process 500 ends. If there are not enough observations of inconsistent geographic location for the specific access point to show that the specific access point is mobile, the process 500 continues to step 590.

In step 590, the client computing device reports the mobile access point to the server (e.g., server 120). After step 590, the process 500 ends.

Figure 6:
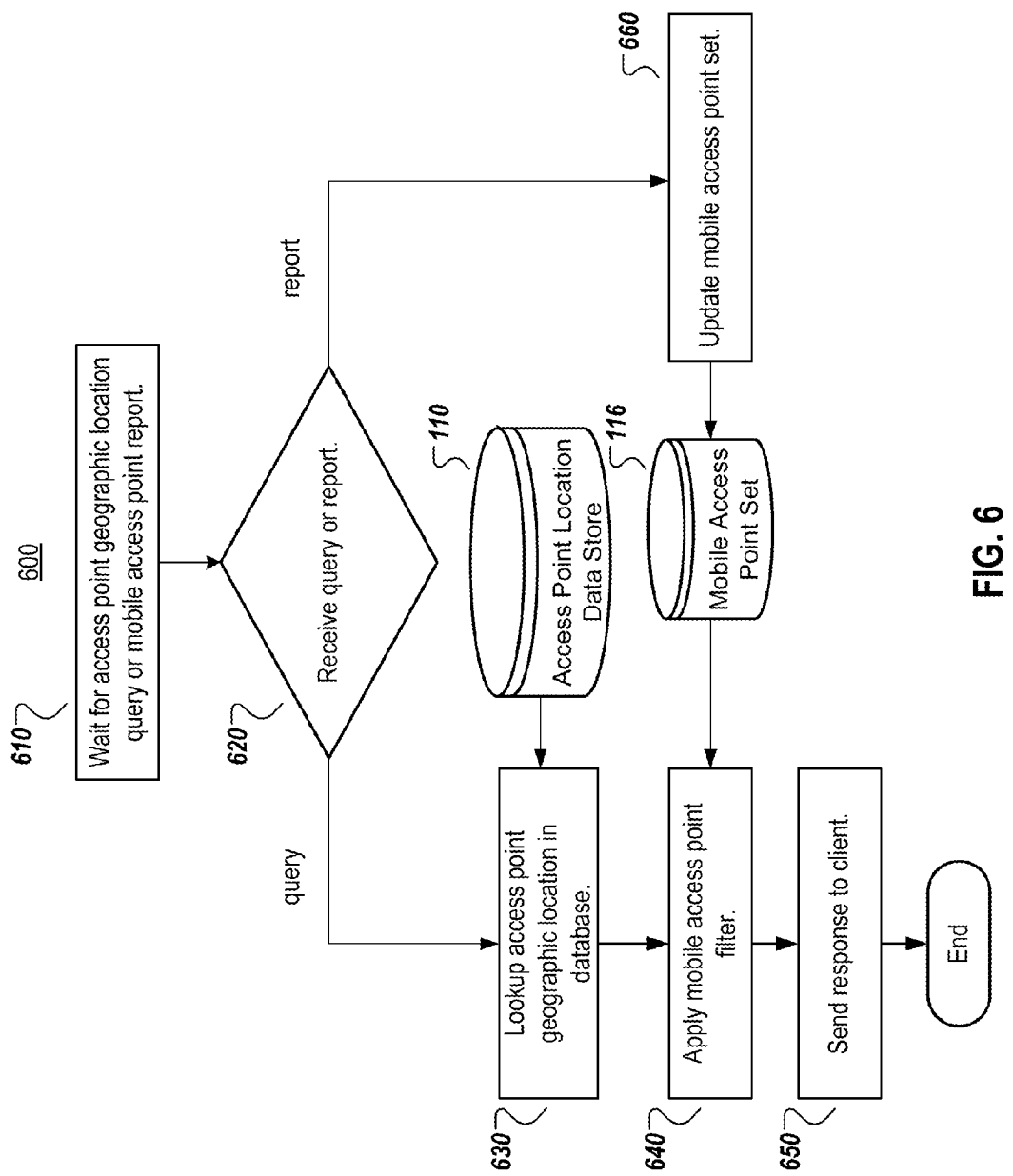
FIG. 6 illustrates an example process by which an access point geographic location query or a mobile access point report may be handled via a server.

FIG. 6 illustrates an example process 600 by which an access point geographic location query or a mobile access point report may be handled via a server.

The process 600 begins at step 610, where the server waits for an access point geographic location query or a mobile access point report.

In step 620, the server receives the query or the report. If the server receives the query, the process 600 continues to step 630. If the server receives the report, the process 600 continues to step 660.

In step 630, if the server receives the query, the server looks up the access point geographic location in the database. The server may receive the access point geographic location from the access point location data store 110.

In step 640, the server applies a mobile access point filter (e.g., mobile access point filter 450) based on a set of mobile access points (e.g., mobile access point set 116) to the received access point geographic locations to filter out the mobile geographic locations. In one example, the mobile access filter of step 640 may be applied before the lookup of the geographic location in step 630.

In step 650, the server sends a response, including a geographic location of the client computing device based on the fixed access points accessible to the client computing device, back to the client computing device. After step 650, the process 600 ends.

In step 660, if the server receives the mobile access point report, the server may update the stored set of mobile access points (e.g., the mobile access point set 116 in the database 102). After step 660, the process 600 ends.

Figure 7:
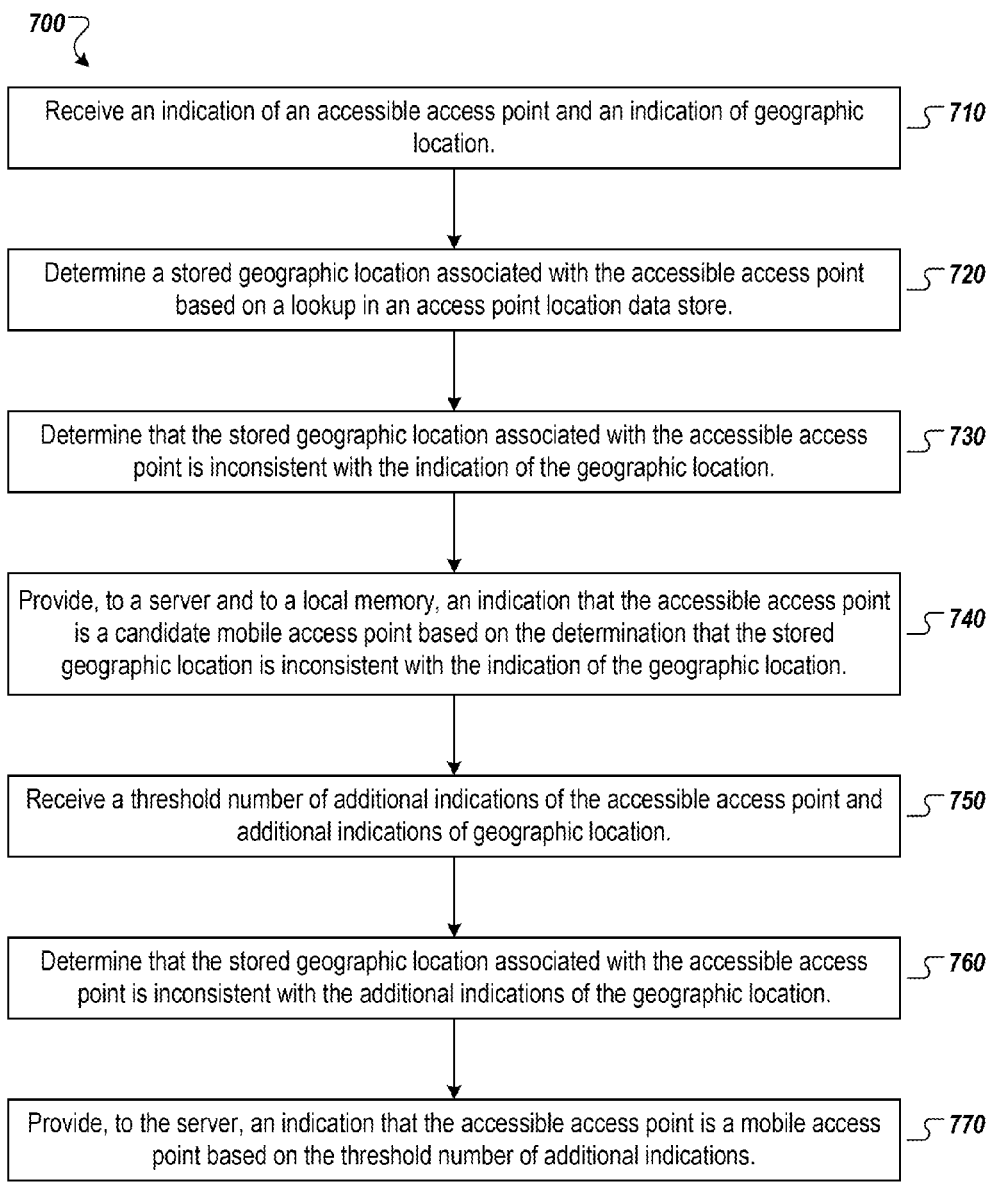
FIG. 7 illustrates an example process by which a mobile access point may be identified via a client computing device.

FIG. 7 illustrates an example process 700 by which a mobile access point may be identified via a client computing device.

The process 700 begins at 710, where the client computing device (e.g., client computing device 122) receives an indication of an accessible access point and an indication of geographic location. The accessible access point may be a WiFi access point. The indication of the accessible access point may be a media access control (MAC) address of the accessible access point or a service set identifier (SSID) of the accessible access point. The client computing device may or may not connect to a network via the accessible access point. The indication of the geographic location may include cellular signal(s) or global positioning system (GPS) signal(s). In one example, the indication of the geographic location may be a lookup, in an access point location data store, for a geographic location of an additional accessible access point. The additional accessible access point may be separate and distinct from the accessible access point.

In step 720, the client computing device determines a stored geographic location associated with the accessible access point based on a lookup in an access point location data store. The access point location data store may reside in a memory of a remote database (e.g., access point location data store 110 in database 102). Alternatively, the access point location data store may reside locally on the client computing device. The client computing device may store the geographic locations of access points when the client computing device observes the access points. The access point location data store may include a data structure, e.g., a table or a hash table, of access point identifiers and geographic locations corresponding to the access point identifiers.

In step 730, the client computing device determines that the stored geographic location associated with the accessible access point is inconsistent with the indication of the geographic location. For example, the stored geographic location associated with the accessible access point may indicate that the access point resides in Los Angeles, Calif., and the client computing device may observe the accessible access point simultaneously with receiving a cellular signal originating in Seattle, Wash. The range of the accessibility of the access point may be 100 meters and the range of accessibility of the cellular signal may be 25 kilometers. As the distance between Los Angeles, Calif. and Seattle, Wash. exceeds 25.1 kilometers, the client computing device may determine that the stored geographic location of the access point is inconsistent with the indication of the geographic location.

In step 740, the client computing device provides, to a server (e.g., server 120) and to a local memory of the client computing device, an indication that the accessible access point is a candidate mobile access point based on the determination that the stored geographic location is inconsistent with the indication of the geographic location.

In example aspects, some of the indications of access points stored either in the database, on the server, or on the client computing device may be associated with a mobile access point likelihood value, which may be an integer or a real number (e.g., an integer between 0 and 100, where 0 represents a strongly likely or known fixed access point and 100 represents a strongly likely or known mobile access point). If the mobile access point likelihood value is within a first range (e.g., between 50 and 100), the associated access point may be a candidate mobile access point. If the mobile access point likelihood is within a second range (e.g., between 75 and 100) the client computing device may conclude with greater certainty that the associated access point is a mobile access point and may send an indication of the conclusion to the server. The mobile access point likelihood value may be modified whenever a geographic location of the associated access point is detected (e.g., decreased by 5 or set to zero whenever the access point is detected in its stored geographic location or increased by 20 or set to 100 whenever the access point is detected greater than a threshold distance (e.g., 200 meters) away from its stored geographic location).

In step 750, the client computing device receives a threshold number (e.g., three) of additional indications of the accessible access point and additional indications of geographic location. For example, the accessible access point that has a stored geographic location of Los Angeles, Calif., may be observed, by the client computing device, in Denver, Colo., Phoenix, Ariz., and Washington, D.C. (The accessible access point may be in an airplane or a bus that travels around the United States.)

In step 760, the client computing device may determine that the stored geographic location associated with the accessible access point (e.g., Los Angeles, Calif.) is inconsistent with the additional indications of the geographic location (e.g., Denver, Colo., Phoenix, Ariz., and Washington, D.C.).

In step 770, the client computing device may provide, to the server, an indication that the accessible access point is a mobile access point based on the threshold number of additional indications. After step 770, the process 700 ends.

Figure 8:
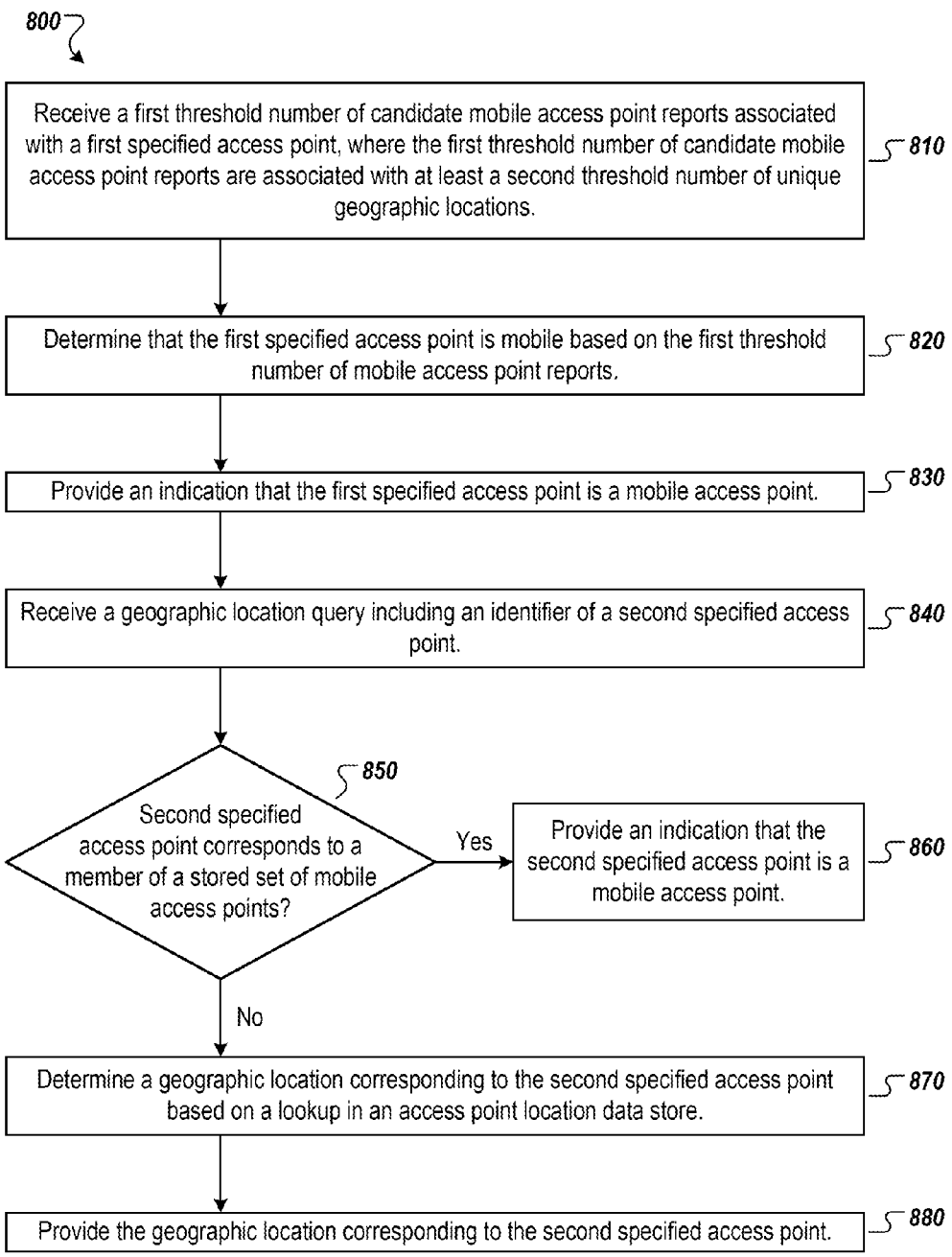
FIG. 8 illustrates an example process by which a determination that an access point is mobile may be made via a server.

FIG. 8 illustrates an example process 800 by which a determination that an access point is mobile may be made via a server.

The process 800 begins at step 810, where the server (e.g., server 120) receives a first threshold number (e.g., three) of candidate mobile access point reports associated with a first specified access point. The first threshold number of candidate mobile access point reports are associated with at least a second number (e.g., two) of unique geographic locations. The second number may be greater than or equal to two. In one example, the first threshold number is equal to the second threshold number. The first threshold number of candidate mobile access point reports maybe associated with at least a preset number (e.g., two) of different client computing devices to reduce the probability that a malicious user of a client computing device is trying to provide incorrect data to the database. The preset number may be greater than or equal to two.

In step 820, the server determines that the first specified access point is mobile based on the first threshold number of mobile access point reports.

In step 830, the server provides an indication (e.g., to a database) that the first specified access point is a mobile access point. The server may add an identifier of the first specified access point to stored set of mobile access point identifiers (e.g., mobile access point set 116 in database 102). The identifier of the first specified access point maybe a Media Access Control (MAC) address of the first specified access point.

In step 840, the server receives a geographic location query (e.g., a query for a current geographic location of a client computing device observing one or more access points). The geographic location query may include an identifier of a second specified access point. The first specified access point may or may not be identical to the second specified access point.

In step 850, the server determines whether the second specified access point corresponds to a member of a stored set of mobile access points (e.g., mobile access point set 116 in database 102). If so, the process 800 continues to step 860. If not, the process 800 corresponds to step 870.

In step 860, if the second specified access point corresponds to a member of a stored set of mobile access points, the server provides an indication that the second specified access point is a mobile access point. No geographic location information for the second specified access point may be provided, as the geographic location of the mobile access point may be unknown. After step 860, the process 800 ends.

In step 870, if the second specified access point does not correspond to a member of a stored set of mobile access points, the server may determine a geographic location corresponding to the second specified access point based on a lookup in an access point location data store (e.g., access point location data store 110).

In step 880, the server may provide (e.g., to the client computing device 122) the geographic location corresponding to the second specified access point based on the second specified access point not corresponding to the member of the stored set of mobile access point identifiers. After step 880, the process 800 ends.

Figure 9:
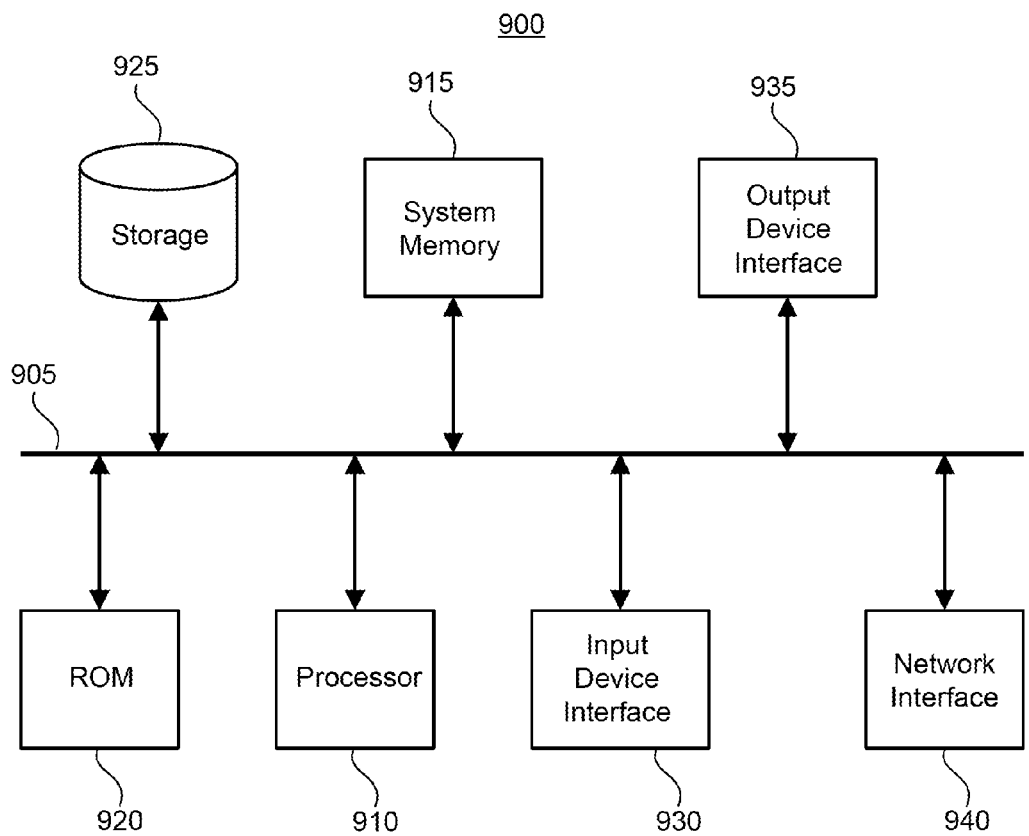
FIG. 9 conceptually illustrates an electronic system with which some implementations of the subject technology are implemented.

FIG. 9 conceptually illustrates an electronic system 900 with which some implementations of the subject technology are implemented. For example, one or more of the database 102, the server 120, or the client computing device 122 may be implemented using the arrangement of the electronic system 900. The electronic system 900 can be a computer (e.g., a mobile phone, PDA), or any other sort of electronic device. Such an electronic system includes various types of computer readable media and interfaces for various other types of computer readable media. Electronic system 900 includes a bus 905, processing unit(s) 910, a system memory 915, a read-only memory 920, a permanent storage device 925, an input device interface 930, an output device interface 935, and a network interface 940.

The bus 905 collectively represents all system, peripheral, and chipset buses that communicatively connect the numerous internal devices of the electronic system 900. For instance, the bus 905 communicatively connects the processing unit(s) 910 with the read-only memory 920, the system memory 915, and the permanent storage device 925.

From these various memory units, the processing unit(s) 910 retrieves instructions to execute and data to process in order to execute the processes of the subject technology. The processing unit(s) can be a single processor or a multi-core processor in different implementations.

The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some implementations of the subject technology use a mass-storage device (for example a magnetic or optical disk and its corresponding disk drive) as the permanent storage device 925.

Other implementations use a removable storage device (for example a floppy disk, flash drive, and its corresponding disk drive) as the permanent storage device 925. Like the permanent storage device 925, the system memory 915 is a read-and-write memory device. However, unlike storage device 925, the system memory 915 is a volatile read-and-write memory, such a random access memory. The system memory 915 stores some of the instructions and data that the processor needs at runtime. In some implementations, the processes of the subject technology are stored in the system memory 915, the permanent storage device 925, or the read-only memory 920. For example, the various memory units include instructions for identifying mobile access points in accordance with some implementations. From these various memory units, the processing unit(s) 910 retrieves instructions to execute and data to process in order to execute the processes of some implementations.

The bus 905 also connects to the input and output device interfaces 930 and 935. The input device interface 930 enables the user to communicate information and select commands to the electronic system. Input devices used with input device interface 930 include, for example, alphanumeric keyboards and pointing devices (also called "cursor control devices"). Output device interfaces 935 enables, for example, the display of images generated by the electronic system 900. Output devices used with output device interface 935 include, for example, printers and display devices, for example cathode ray tubes (CRT) or liquid crystal displays (LCD). Some implementations include devices for example a touchscreen that functions as both input and output devices.

Finally, as shown in FIG. 9, bus 905 also couples electronic system 900 to a network (not shown) through a network interface 940. In this manner, the electronic system 900 can be a part of a network of computers (for example a local area network ("LAN"), a wide area network ("WAN"), or an Intranet, or a network of networks, for example the Internet. Any or all components of electronic system 900 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for providing an indication that an access point is a candidate mobile access point, the method comprising:

receiving, at a computing device, a plurality of observations, each observation comprising an identifier of an access point accessible to the computing device and an indication of geographic location of the computing device;

determining, at the computing device, that a stored geographic location associated with the access point is inconsistent with the indications of the geographic location of the computing device in the plurality of observations and that at least two of the indications of the geographic location correspond to distinct geographic locations; and providing, from the computing device to a server, an indication that the access point is a candidate mobile access point that traveled at least a threshold distance during a plurality of time periods of a predetermined length based on the determination that the stored geographic location of the access point is inconsistent with the indication of the geographic location of the computing device in the plurality observations and the determination that the at least two of the indications of the geographic location correspond to distinct geographic locations.

2. The method of claim 1, further comprising providing, to a local memory of the computing device, the indication that the access point is the candidate mobile access point.

3. The method of claim 1, further comprising:
receiving, at the computing device, a threshold number of additional identifiers of the access point from the access point and additional indications of geographic location of the computing device;
determining, at the computing device, that the stored geographic location associated with the access point is inconsistent with the additional indications of the geographic location of the computing device; and
providing, from the computing device to the server, an indication that the access point is a mobile access point based on the threshold number of additional indications.

4. The method of claim 1, further comprising:
determining the stored geographic location associated with the access point based on a lookup in an access point location data store.

5. The method of claim 1, wherein the identifier of the access point comprises a media access control (MAC) address of the access point.

6. The method of claim 1, wherein the access point comprises a WiFi access point.

7. The method of claim 1, wherein the indication of the geographic location of the computing device comprises one or more cellular signals.

8. The method of claim 1, wherein the indication of the geographic location of the computing device comprises one or more global positioning system (GPS) signals.

9. The method of claim 1, wherein the indication of the geographic location of the computing device comprises a lookup, in an access point location data store, for a geographic location of an additional access point accessible to the computing device, the additional access point being separate and distinct from the access point.

10. A computing device for providing an indication that an access point is a candidate mobile access point, the computing device comprising:
one or more processors;
a network interface; and
a memory comprising instructions which, when executed by the one or more processors, cause the one or more processors to:
receive a plurality of observations, each observation comprising a media access control (MAC) address of a WiFi access point accessible to the network interface and an indication of geographic location of the computing device;
determine that a stored geographic location associated with the WiFi access point is inconsistent with the indications of the geographic location of the computing device in the plurality of observations and that at least two of the indications of the geographic location correspond to distinct geographic locations; and
provide, to a server, an indication that the WiFi access point is a candidate mobile access point that traveled at least a threshold distance during a plurality of time periods of a predetermined length based on the determination that the stored geographic location of the WiFi access point is inconsistent with the indication of the geographic location of the computing device in the plurality observations and the determination that the at least two of the indications of the geographic location correspond to distinct geographic locations.

* * * * *